(12) United States Patent
Liang et al.

(10) Patent No.: US 10,384,761 B2
(45) Date of Patent: Aug. 20, 2019

(54) UNMANNED AERIAL VEHICLE ARM ADJUSTMENT DEVICE AND UNMANNED AERIAL VEHICLE

(71) Applicant: Zerotech (Shenzhen) Intelligence Robot Co., Ltd, Shenzhen, Guangdong (CN)

(72) Inventors: Yucheng Liang, Beijing (CN); Fuhua Ai, Beijing (CN)

(73) Assignee: Zerotech (Shenzhen) Intelligence Robot Co., Ltd, Shenzhen (CN)

( * ) Notice: Subject to any disclaimer, the term of this patent is extended or adjusted under 35 U.S.C. 154(b) by 615 days.

(21) Appl. No.: 15/210,521

(22) Filed: Jul. 14, 2016

(65) Prior Publication Data

US 2017/0015403 A1    Jan. 19, 2017

(30) Foreign Application Priority Data

Jul. 15, 2015   (CN) ...................... 2015 2 0512611 U
Aug. 27, 2015   (CN) ...................... 2015 2 0652906 U

(51) Int. Cl.
*B64C 1/30* (2006.01)
*B64C 39/02* (2006.01)
*B64C 1/06* (2006.01)

(52) U.S. Cl.
CPC ............... *B64C 1/30* (2013.01); *B64C 1/063* (2013.01); *B64C 39/024* (2013.01); *B64C 2201/027* (2013.01); *B64C 2201/102* (2013.01); *B64C 2201/20* (2013.01)

(58) Field of Classification Search
CPC .. B64C 1/063; B64C 1/28; B64C 1/30; B64C 2201/102
See application file for complete search history.

(56) References Cited

U.S. PATENT DOCUMENTS 10,118,697 B2 * 11/2018 Weissenberg ......... B64C 39/024
2017/0313401 A1 * 11/2017 Tang ........................ B64C 1/30

FOREIGN PATENT DOCUMENTS

CA          2888144  A1 *   4/2014   ............... B64C 1/30

* cited by examiner

*Primary Examiner* — Richard R. Green
(74) *Attorney, Agent, or Firm* — Leydig, Voit & Mayer, Ltd.

(57) ABSTRACT

An unmanned aerial vehicle arm adjustment device for adjusting an unmanned aerial vehicle arm into a folding state or an extracting state with respect to a fuselage of the aerial vehicle includes: left and right curb plates connected to the fuselage; a rocking arm connected to the unmanned aerial vehicle arm, wherein one end of the rocking arm is articulated with the left and right curb plates, and a first engaging part is provided on the rocking arm; and a locking member articulated with the left and right curb plates, wherein the locking member is provided with a second engaging part for engaging with the first engaging part; wherein the locking member is adapted to rotate in a first direction to force the second engaging part to engage with the first engaging part so as to hold the rocking arm such that the unmanned aerial vehicle arm is in the extracting state; and wherein the locking member is adapted to rotate in a second direction opposite to the first direction to force the second engaging part to disengage with the first engaging part so as to release the rocking arm such that the unmanned aerial vehicle arm is able to be rotated into the folding state.

12 Claims, 7 Drawing Sheets

US 10,384,761 B2

UNMANNED AERIAL VEHICLE ARM ADJUSTMENT DEVICE AND UNMANNED AERIAL VEHICLE

CROSS-REFERENCE TO RELATED APPLICATIONS

Priority is claimed to Chinese Patent Application No. 201520512611.4, filed on Jul. 15, 2015, and to Chinese Patent Application No. 201520652906.1, filed on Aug. 27, 2015, the entire disclosures of which are hereby incorporated by reference herein.

FIELD

The present application relates to the technical field of unmanned aerial vehicles, and more specifically relates to an unmanned aerial vehicle arm adjustment device.

BACKGROUND

Due to their many advantages, unmanned aerial vehicles have been applied more and more widely in civil fields. Meanwhile, users in civil fields are also highly demanding on the emergency usability and portability of unmanned aerial vehicles.

The portability issue of a multi-rotor-wing unmanned aerial vehicle is mainly embodied in retracting and folding a rotor-wing arm and a foot stand. The multi-rotor-wing arms used in the existing aerial photography industry are mostly unfoldable or detachable types, wherein a detachable-type arm faces an issue of electric connection; moreover, the process of detachment is rather troublesome; while for foldable unmanned aerial vehicles, their arms cannot take into account the working conditions of the rotor wing unmanned aerial vehicle arm due to mechanism selection and design, which causes the arm mechanism to have issues like loose connection and gap, thereby affecting the stability of the unmanned aerial vehicle in flight as well as the usability and portability; meanwhile, it is adverse to transport and store the unmanned aerial vehicle and brings much trouble and inconvenience to the user.

SUMMARY

Exemplary embodiments of the invention provide an unmanned aerial vehicle arm adjustment device, which performs folding and unfolding of the unmanned aerial vehicle arm quickly and simply, enhances the working stability of an extracted unmanned aerial vehicle arm, and meanwhile facilitates storage and transportation of the unmanned aerial vehicle with the arm being folded.

In an exemplary embodiment, the invention provides an unmanned aerial vehicle arm adjustment device for adjusting an arm into the folding state or the extracting state with respect to a fuselage of the aerial vehicle, wherein the unmanned aerial vehicle arm adjustment device comprises: left and right curb plates connected to the fuselage; a rocking arm connected to the arm, and one end of the rocking arm pivotally arranged between the left and right curb plates, a first engaging part provided on the rocking arm; a locking member pivotally arranged between the left and right curb plates and provided with a second engaging part for engaging with the first engaging part; wherein the locking member is adapted to rotate in a first direction to force the second engaging part to engage with the first engaging part so as to hold the rocking arm, such that the arm is in the extracting state; and the locking member is adapted to rotate in a second direction opposite to the first direction to force the second engaging part to disengage with the first engaging part so as to release the rocking arm, such that the arm is able to be rotated into the folding state.

In an exemplary embodiment, the first engaging part comprises a snap groove, and the locking member comprises a depressing plate, and the second engaging part comprises a columnar member provided on the depressing plate and for engaging with the snap groove.

In an exemplary embodiment, the unmanned aerial vehicle arm adjustment device further comprising a torsional spring mounded on the depressing plate, for biasing the columnar member towards the snap groove.

In an exemplary embodiment, the depressing plate comprises a depressing part, wherein when the depressing part is pushed downward, the columnar member moves upward to disengage with the groove so as to release the arm.

In an exemplary embodiment, the unmanned aerial vehicle arm adjustment device further comprises a rod, a first end of the rod is connected to a bottom side of the depressing plate and adjacent to the columnar member, and the second end of the rod extends downward, wherein when the second end of the rod is pushed upward, the columnar member moves upward to disengage with the groove, thus releasing the arm.

In an exemplary embodiment, the unmanned aerial vehicle arm adjustment device further including a rod, a first end of the rod is connected to a bottom side of the depressing plate and adjacent to the depressing part, and the second end of the rod extends downward, wherein when the second end of the rod is pulled downward, the columnar member moves upward to disengage with the groove, thus releasing the arm.

In an exemplary embodiment, each of the left and right curb plates includes a stop groove; in the extracting state of the arm, the columnar element simultaneously enters into the snap groove and the stop groove; in the folding state of the arm, the columnar element enters into the stop groove only.

In an exemplary embodiment, when the arm is in the extracting state, the snap groove and the stop groove are slightly staggered.

In an exemplary embodiment, the unmanned aerial vehicle arm adjustment device comprises a holding mechanism, the holding mechanism comprises a spring plunger provided on at least one of the left and right curb plates, and a location recess is provided on the side adjacent to the at least one of the left and right curb plates of the rocking arm, and wherein in the folding state of the arm, the spring plunger enters into the location recess to keep the arm in the folding state.

In an exemplary embodiment, at least one of the left and right curb plates is provided with a weight-reducing hole or groove.

In an exemplary embodiment, the rocking arm comprises a connecting piece and an arm barrel which are integrally manufactured; one end of the connecting piece is articulated with the left and right curb plates; the connecting piece includes the snap groove; the arm barrel is a hollow tube in a hoop shape, a diameter of the hollow tube being greater than a diameter of the arm; a free end of the arm barrel is tight locked through at least one set of bolts and nuts; a weight-reducing hole or groove is provided on the arm barrel.

In an exemplary embodiment, the unmanned aerial vehicle arm adjustment device further comprises a stop block provided on at least one of the left and right curb plates, for limiting the rotation angle of the rocking arm.

In another exemplary embodiment, the invention provides an unmanned aerial vehicle comprising the unmanned aerial vehicle arm adjustment device.

Advantages achieved by exemplary embodiments of the invention include including at least one of the following: the unmanned aerial vehicle arm adjustment device can simply and quickly fold and unfold the unmanned aerial vehicle arm;
the arm will not rock after being extracted;
the unmanned aerial vehicle arm adjustment device is able to be operated manually and conveniently implement folding and unfolding of the unmanned aerial vehicle arm conveniently without utilization of other tools, thereby facilitating transportation and storage of the unmanned aerial vehicle; and
the unmanned aerial vehicle arm adjustment device may be widely applied to various kinds of unmanned aerial vehicles due to its simple structure, strong stability, convenient operation, and good reliability.

BRIEF DESCRIPTION OF THE ACCOMPANYING DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

REFERENCE NUMERALS

Figure 1:
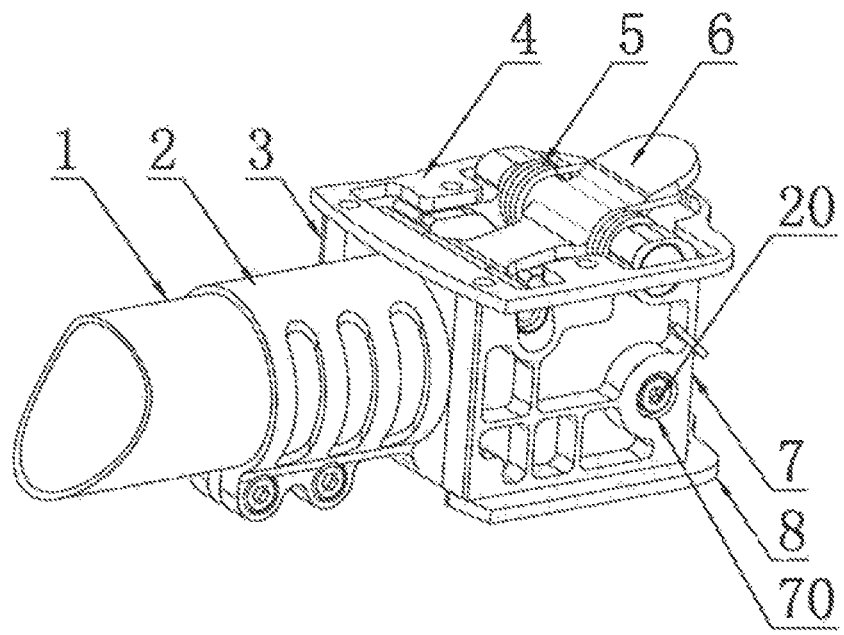
FIG. 1 illustrates a schematic state diagram of a first exemplary embodiment of an unmanned aerial vehicle arm adjustment device being extracted.

1. Arm;
2. Rocking arm;
20. Axis;
21. Snap groove;
22. Connecting piece;
221 Positioning Recess;
23. Arm barrel;
3. Left curb side;
4. Upper frame;
40. Front baffle;
5, Twins torsional spring;
50. Stress end;
51. Fixed end;
6, depressing plate;
61. Locking part;
62. Articulating part;
63. Depressing part;
7. Right curb side;
70. Hole;
71. Stop groove;
72 Stop block;
8. Lower frame;
80. Rear baffle;
9. Holding mechanism;
91. Spring;
92. Connection bolt;
93. Spring plunger.

DETAILED DESCRIPTION

Exemplary embodiments of the invention are described below in detail with reference to the accompanying drawings.

First Exemplary Embodiment

FIGS. 1-4 illustrate a first exemplary embodiment of an unmanned aerial vehicle arm adjustment device, comprising a rocking arm 2, a left curb side 3, and a right curb plate 7; the rocking arm 2 is connected to the rocking arm 1; the left curb plate 3 and the right curb plate 7 are connected to the fuselage; the rocking arm 2 is articulated with the left curb plate 3 and the right curb plate 7.

Figure 2:
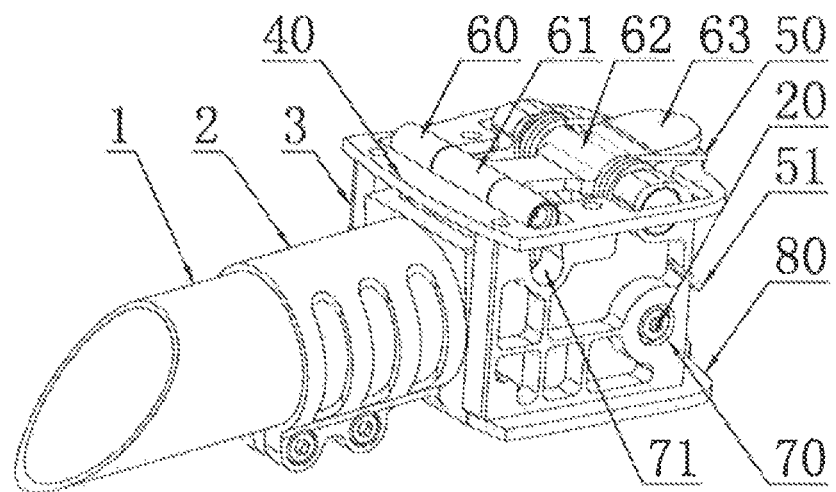
FIG. 2 illustrates a schematic state diagram of depressing a depressing plate when the unmanned aerial vehicle arm adjustment device in FIG. 1 is extracted.
Figure 3:
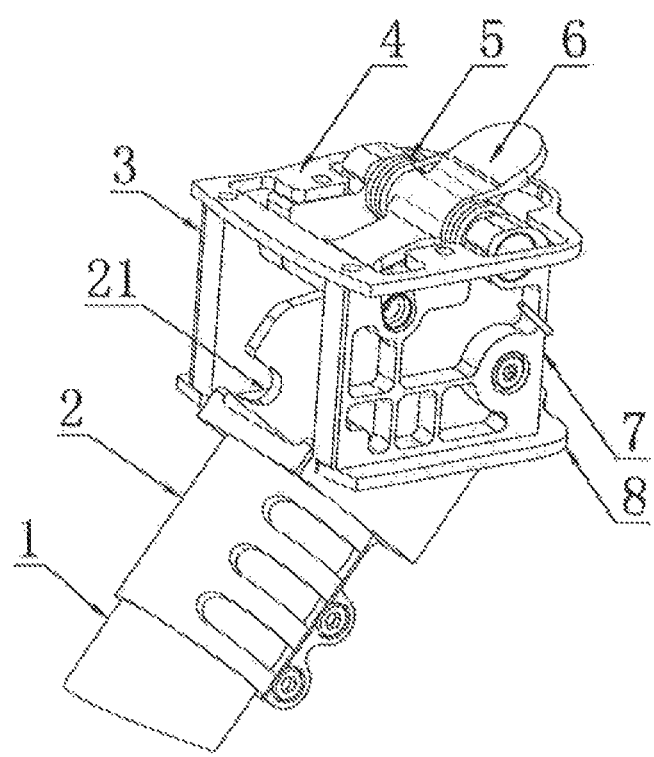
FIG. 3 illustrates a schematic state diagram of a process of folding a rocking arm of the unmanned aerial vehicle arm adjustment device in FIG. 1.

As illustrated in FIGS. 1-3, specifically, one end of the rocking arm 2 is disposed between the left curb plate 3 and the right curb plate 7. The rocking arm 2 symmetrically extends out with shafts 20 to two sides. Holes 70 cooperating with the shafts 20 are provided on the left curb plate 3 and the right curb plate 7. The rocker arm 2 is articulated with the left curb plate 3 and right curb plate 7 via the shafts 20 and the holes 70. The rocking arm 2 rotates about the shafts 20 as rotational axes. A first engaging part is provided on the rocking arm 2, and the first engaging part includes a snap groove 21.

The fuselage comprises upper frame 4 and lower frame 8 disposed at upper and lower sides of the left curb plate 3 and the right curb plate 7, i.e., the left curb plate 3 and the right curb plate 7 are inserted between the upper frame 4 and the lower frame 8; upper ends of the left curb plate 3 and the right curb plate 7 are articulated to a depressing plate 6 with a side lever protruding from two sides. The depressing plate 6 rotates with the side lever as a rotational axis. A front end of the depressing plate 6 is connected to a second engaging part, the second engaging part includes a columnar member 60 for engaging with the first engaging part. The second engaging part includes columnar member 60, for engaging into the snap groove 21, such that the arm 1 is in an extracting state.

In the first embodiment, the snap groove 21 of the first engaging part and the columnar member 60 of the second engaging part may be exchanged, that is to say, the first engaging part includes the columnar member 60 and the second engaging part includes the snap groove 21.

It should be noted that in order to facilitate explaining and describing the positional relationships in the present application, when the unmanned aerial vehicle arm is extracted, a view angle is set such that the arm 1 is disposed at a front side of the rocking arm 2, the left curb plate 3 is disposed at a left side of the right curb plate 7, and the upper frame 4 is disposed at an upper side of the lower frame 8.

As illustrated in FIG. 2, the depressing plate 6 comprises a locking part 61, an articulating part 62 and a depressing part 63. Two flank sides of the locking part 61 are each connected to a columnar member 60 cooperating with the snap groove 21 and/or stop groove 71; the articulating part 62 is articulated to the rear half part at the upper end of the left curb plate 3 and right curb plate 7 through side levers extending from the two flank sides, respectively; the stress end 50 of the twins torsional spring 5 abuts against the lower side of the depressing part 63, and the two fixed ends 51 are snapped to the rear end part of the left curb plate 3 and that of the right curb plate 7, respectively. The fixed end 51 may also be snapped into a weight-reducing hole or groove.

More specifically, two side levers of the depressing plate 6 pass through coils of the twins torsional spring 5; a stress end 50 of the twins torsional spring 5 abuts against a lower side at a rear end of the depressing plate 6, and two fixing ends 51 are snapped on the left curb plate 3 and the right curb plate 7, respectively. Through a force generated by deformation of the twins torsional spring 5, a biasing force is provided to rotation of the depressing plate 6 along the side lever. Of course the twins torsional spring 5 may be replaced with other types of torsional spring.

Figure 4:
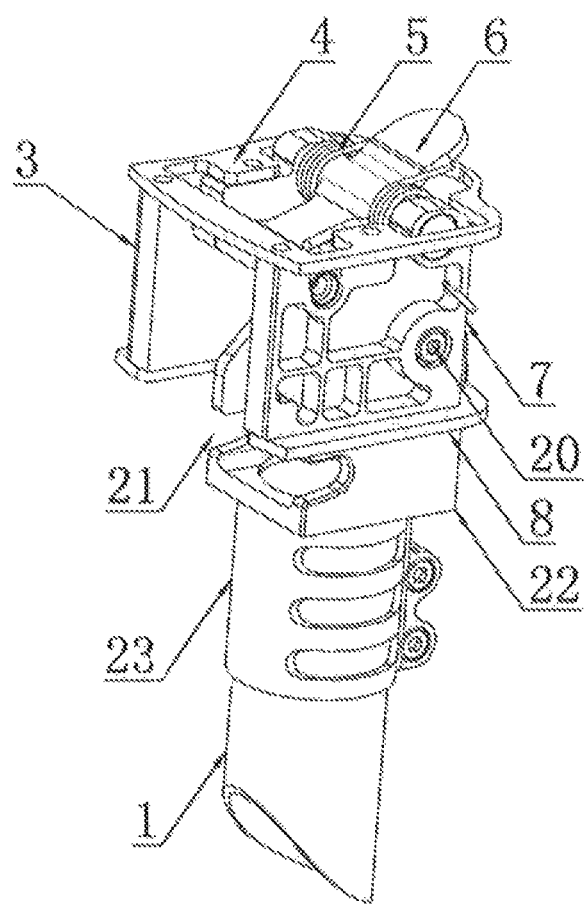
FIG. 4 illustrates a schematic state diagram of the unmanned aerial vehicle arm adjustment device in FIG. 1 being folded.
Figure 5:
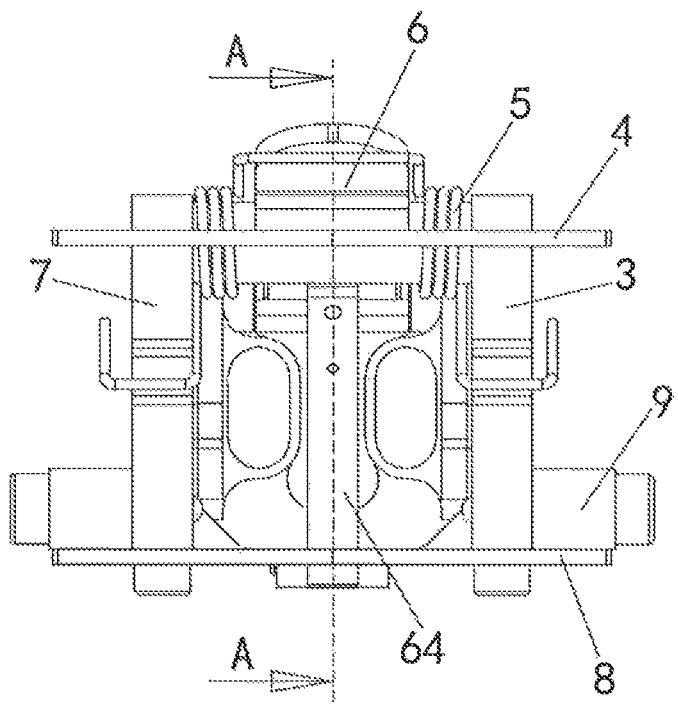
FIG. 5 illustrates a schematic state diagram of a second exemplary embodiment of the unmanned aerial vehicle arm adjustment device being extracted.
Figure 6:
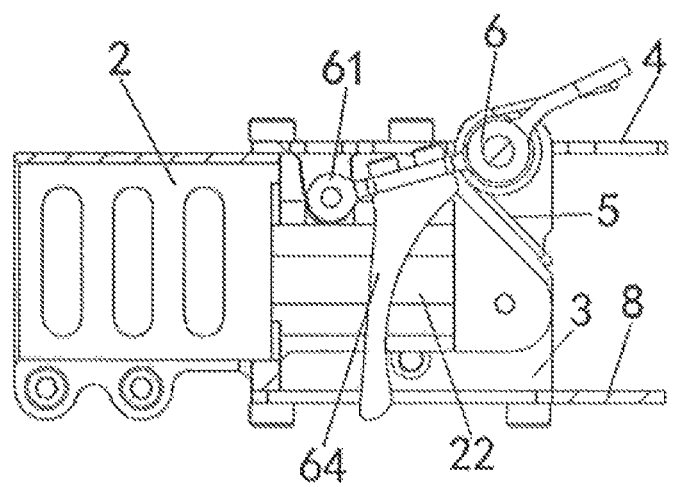
FIG. 6 illustrates a cross section taken along line A-A as shown in FIG. 5.
Figure 7:
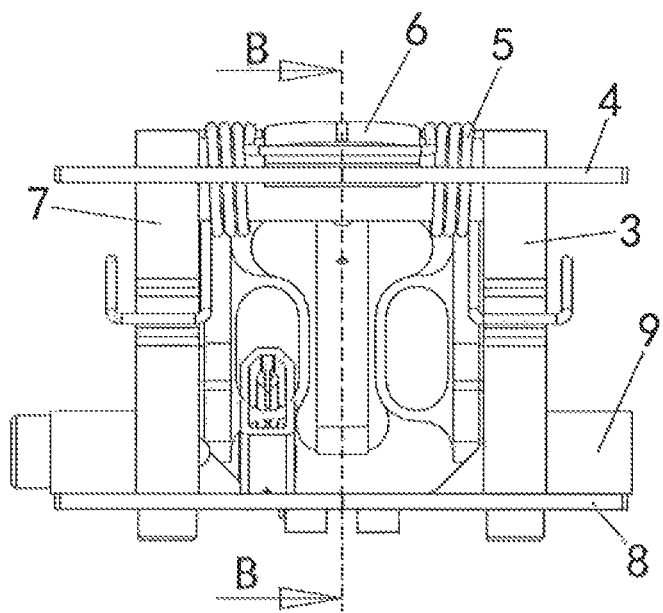
FIG. 7 illustrates the rod being pushed upward when the unmanned aerial vehicle arm adjustment device in FIG. 5 is extracted.
Figure 8:
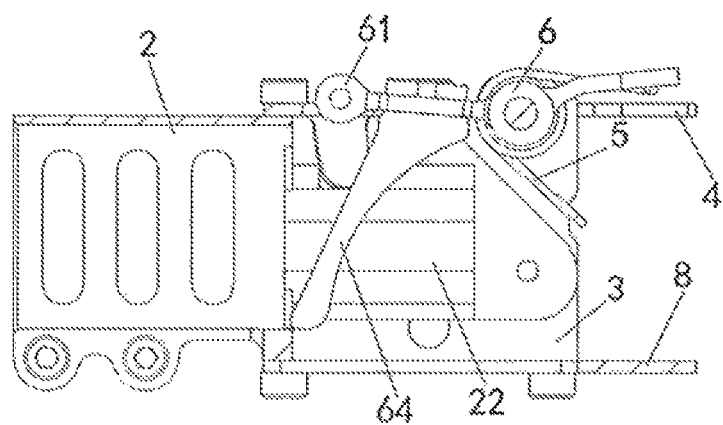
FIG. 8 illustrates a cross section taken along line B-B in FIG. 7.

As illustrated in FIGS. 2-4, the snap groove 21 is of a bar shape, extending from an upper side of the rocking arm 2 to the right lower side of the rocking arm 2; a depth of the snap groove 21 is larger than a diameter of the columnar member 60. Under an actuation force of the stress end 50 of the twins torsional spring 5 abutting against the depressing plate 6, when the columnar member 60 enters into the snap groove 21, the columnar member 60 has a trend of moving towards a bottom of the snap groove 21; therefore, the fixing of the columnar member 60 with respect to the snap groove 21 is firm.

As illustrated in FIGS. 1-4, in order to stabilize the unmanned aerial vehicle arm 1 or the rolling arm and prevent the extracted unmanned aerial vehicle arm 1 from rocking, the front end of the upper frame 4 is provided with a front baffle 40 integrally manufactured with the upper frame 4; the upper frame 4 includes a through hole in a vertical direction for accommodating the depressing sheet and the twins torsional spring 5. A portion of an upper art of the left curb plate 3 and that of the right curb plate 7 which is articulated to the depressing plate 6 projects into the through hole. The upper frame 4 is connected with the left curb plate 3 and right curb plate 7 through bolts; a front end of the lower frame 8 has openings; a rear end thereof is provided with a rear baffle 80 integrally manufactured with the lower frame 8; the lower frame 8 is connected to the left curb plate 3 and the right curb plate 7 through bolts.

As illustrated in FIGS. 2 and 4, the rock arm 2 comprises a connecting piece 22 and a rock barrel 23 that are integrally processed. Of course, the connecting piece 22 and the arm barrel 23 may be processed separately if desired.

One end of the connecting piece 22 is articulated to the left curb plate 3 and the right curb plate 7; at an upper side of the connecting piece 22 includes a snap groove 21 cooperating with the columnar member 60. The arm barrel 23 is a hollow tube in a hoop shape, a diameter of the hollow tube being greater than a diameter of the arm 1. A free end of the arm barrel 23 is tight locked through at least one set of bolts and nuts; a weight-reducing hole or groove is disposed on the arm barrel 23. One end of the connecting piece 22 is articulated with a lower portion of the rear end of the left curb plate 3 and of the right curb plate 7; a stop groove 71 is disposed at an upper part of the front end of the left curb plate 3 and that of the right curb plate 7, which stop groove 71 having a same size as the snap groove 21. When the arm 1 is in an extracting state, the snap groove 21 and the stop groove 71 are in a parallel state, and the columnar member 60 simultaneously enters into the snap groove 21 and the stop groove 71. When the arm 1 in the folding state, the columnar element 60 enters into the stop groove 71 only. Alternatively, when the arm 1 is in an extracting state, the snap groove 21 and the stop groove 71 are slightly staggered so as to firmly hold the columnar member 60 therein.

At least one weight-reducing hole or groove is disposed at the left curb plate 3 and/or the right curb plate 7.

In order to reduce the weight of the unmanned aerial vehicle arm adjustment device, weight-reducing holes are provided for a plurality of structures. Both the left curb plate 3 and the right curb plate 7 include weight-reducing holes. The lower side of the rear ends of the left curb plate 3 and the right curb plate 7 include holes 70. The weight-reducing holes are distributed between the stop grooves 71 and the holes 70.

The left curb plates 3 and the right curb plates 7 may have the same structure and are arranged in a symmetrical relationship. The distance between the upper frame 4 and the lower frame 8 is greater than the diameter of the arm barrel 23.

The working principle of exemplary embodiments of the invention include:

1. Arm Extracting state: as illustrated in FIG. 1 which is a schematic diagram of an extracting state of an unmanned aerial vehicle arm adjustment device, the depressing plate 6 and the columnar member 60 are under an elastic action of the twins torsional spring 5; the columnar member 60 produces extrusion to the rocking arm 2 such that the rocking arm 2 cannot move downward, while the rocking arm 2 cannot continuously move upward due to the limit of the front baffle 40 of the upper frame 4; then the rocking arm 2 will be in a horizontal or approximately horizontal state at this point.

2. Arm Folding state: when the arm 1 needs to be folded, it is only needed to manually depress the depressing part 63 of the depressing plate 6, then the columnar member 60 leaves from the snap groove 21; meanwhile, the rocking arm 2 is pressed downward; then the rocking arm 2 is cast off from the limit of the columnar member 60 to implement a folding state. The sequence in the folding process refers to the sequences in FIGS. 1, 2, 3, and 4.

When the arm 1 needs to be extracted again, it is only needed to manually lift the rocking arm 2; then it may be implemented that the rocking arm 2 is snapped by the depressing plate 6 and the columnar member 60. During the process of lifting the rocking arm 2, an outer profile structure of the rocking arm 2 will first overcome the biasing force of the torsional spring, so as to first lift the depressing plate 6 and the columnar member 60 upward, which then slide downward into the snap groove 21 on the rocking arm 2, further causing the columnar member 60 to enter into the snap groove 21, and causing the rocking arm 23 to be in an extracting state. The unfoldment process is shown in FIGS. 4, 3, 2, and 1.

Second Exemplary Embodiment

FIGS. 5-10 illustrate a second exemplary embodiment of an unmanned aerial vehicle arm adjustment device. Only the differences between the second exemplary embodiment and the first exemplary embodiment are described below.

The unmanned aerial vehicle arm adjustment device comprises a rod 64. A first end of the rod 64 is connected to a bottom side of the depressing plate 6 and adjacent to the columnar member 6. The second end of the rod 64 extends downward. When the second end of the rod 64 is pushed upward, the columnar member 60 moves upward to disengage with the snap groove 21, thus releasing the arm 1.

Alternatively, the unmanned aerial vehicle arm adjustment device comprises a rod 64, a first end of the rod 64 is connected to a bottom side of the depressing plate 6 and adjacent to the depressing part 63, and the second end of the rod 64 extends downward, wherein when the second end of the rod 64 is pulled downward, the columnar member 60 moves upward to disengage with the snap groove 21, thus releasing the arm 1.

Due to the absence of the depressing part, it is unnecessary to arrange openings for the depressing part on the outer casing of the unmanned aerial vehicle. Consequently, the waterproof performance of the unmanned aerial vehicle is improved.

Figure 9:
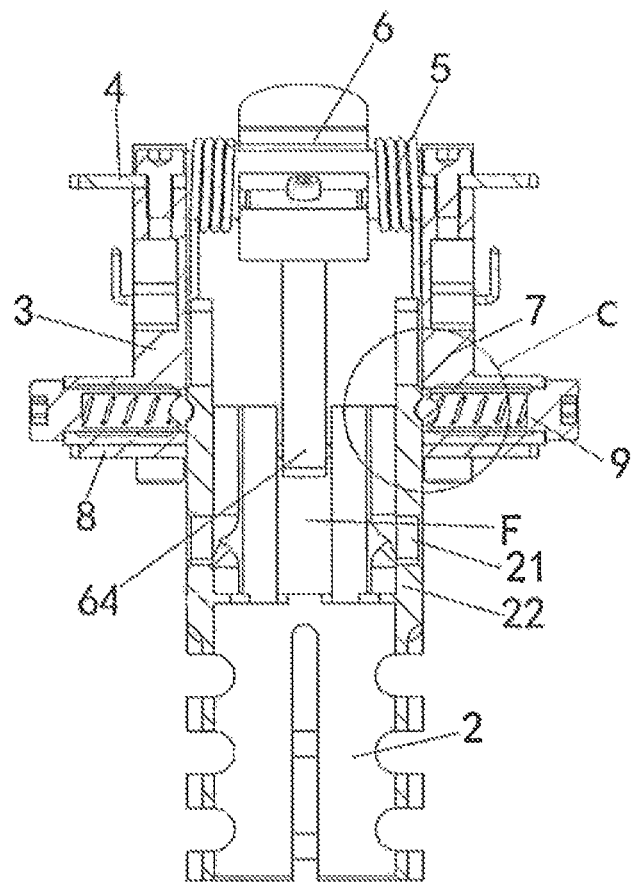
FIG. 9 illustrates a schematic state diagram of the unmanned aerial vehicle arm adjustment device in FIG. 5 being folded.
Figure 10:
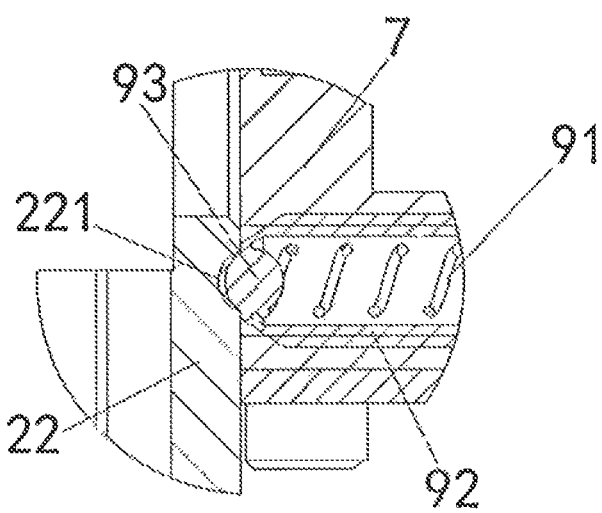
FIG. 10 illustrates an enlarged view of the part C shown in FIG. 9.

Optionally, as illustrated in FIGS. 9 and 10, the unmanned aerial vehicle arm adjustment device comprises a holding mechanism 9, the holding mechanism 9 comprises a spring plunger provided on one of the left and right curb plates 3 and 7, and a location recess 221 is provided on the side adjacent to the one of the left and right curb plates 3 and 7 of the rocking arm 2. In the folding state of the arm 1, the spring plunger 93 enters into the location recess 221 to keep the arm 1 in the folding state. As a result, it could present the arm 1 from rocking which would be caused by outer force.

Third Exemplary Embodiment

Figure 11:
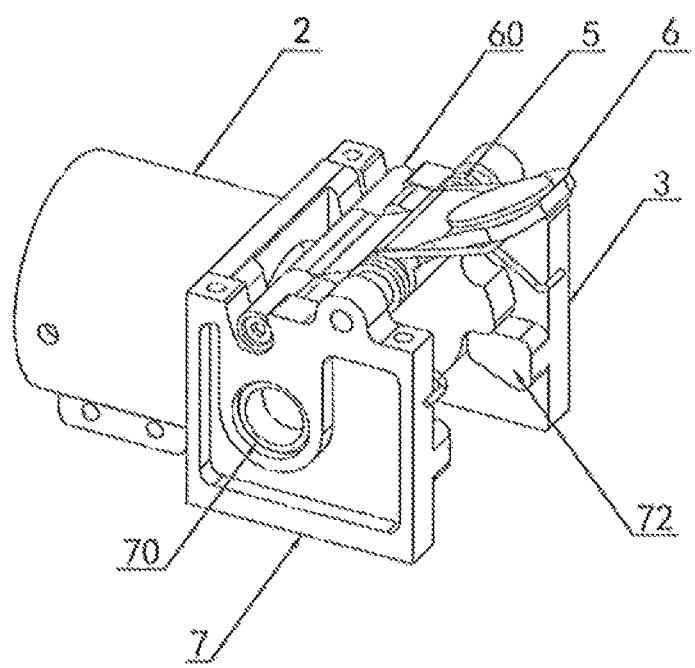
FIG. 11 illustrates a schematic state diagram of a third exemplary embodiment of the unmanned aerial vehicle arm adjustment device being extracted.

FIG. 11 illustrates a third exemplary embodiment of an unmanned aerial vehicle arm adjustment device. Only the differences between the third exemplary embodiment and the first and second exemplary embodiments are described below.

In FIG. 11, a stop block 72 is provided on at least one of the left and right curb plates 3 and 7, for limiting the rotation angle of the rocking arm 2, further ensuring the stability of the folded and extracting states.

In further exemplary embodiments, the invention further provides an unmanned aerial vehicle including an unmanned aerial vehicle arm adjustment device as discussed herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An unmanned aerial vehicle arm adjustment device for adjusting an unmanned aerial vehicle arm into a folding state or an extracting state with respect to a fuselage of the aerial vehicle, wherein the unmanned aerial vehicle arm adjustment device comprises:
   left and right curb plates connected to the fuselage;
   a rocking arm connected to the unmanned aerial vehicle arm, wherein one end of the rocking arm is articulated with the left and right curb plates, and a first engaging part is provided on the rocking arm; and
   a locking member articulated with the left and right curb plates, wherein the locking member is provided with a second engaging part for engaging with the first engaging part;
   wherein the locking member is adapted to rotate in a first direction to force the second engaging part to engage with the first engaging part so as to hold the rocking arm such that the unmanned aerial vehicle arm is in the extracting state;
   wherein the locking member is adapted to rotate in a second direction opposite to the first direction to force the second engaging part to disengage with the first engaging part so as to release the rocking arm such that the unmanned aerial vehicle arm is able to be rotated into the folding state; and
   wherein the first engaging part comprises a snap groove, wherein the locking member comprises a depressing plate, and wherein the second engaging part comprises a columnar member provided on the depressing plate and for engaging with the snap groove.

2. The unmanned aerial vehicle arm adjustment device according to claim 1, further comprising:
   a torsional spring mounted on the depressing plate for biasing the columnar member towards the snap groove.

3. The unmanned aerial vehicle arm adjustment device according to claim 1, wherein the depressing plate comprises a depressing part configured to be pushed downward, and wherein when the depressing part is pushed downward, the columnar member moves upward to disengage with the snap groove so as to release the arm.

4. The unmanned aerial vehicle arm adjustment device according to claim 3, further comprising:
   a rod, wherein a first end of the rod is connected to a bottom side of the depressing plate and adjacent to the depressing part, and the second end of the rod extends downward, wherein the second end of the rod is configured to be pulled downward, and wherein when the second end of the rod is pulled downward, the columnar member moves upward to disengage with the snap groove so as to release the unmanned aerial vehicle arm.

5. The unmanned aerial vehicle arm adjustment device according to claim 1, further comprising:
   a rod, wherein a first end of the rod is connected to a bottom side of the depressing plate and adjacent to the columnar member, and the second end of the rod extends downward, wherein the second end of the rod is configured to be pushed upward, and wherein when the second end of the rod is pushed upward, the columnar member moves upward to disengage with the snap groove so as to release the unmanned aerial vehicle arm.

6. The unmanned aerial vehicle arm adjustment device according to claim 1, wherein each of the left and right curb plates includes a stop groove;
   wherein in the extracting state of the arm, the columnar element simultaneously enters into the snap groove and the stop groove;
   wherein in the folding state of the arm, the columnar element enters into the stop groove only.

7. The unmanned aerial vehicle arm adjustment device according to claim 6, wherein when the arm is in the extracting state, the snap groove and the stop groove are staggered.

8. The unmanned aerial vehicle arm adjustment device according to claim 1, further comprising:
   a holding mechanism, wherein the holding mechanism comprises a spring plunger provided on at least one of the left and right curb plates, and wherein a location recess is provided on the side adjacent to the at least one of the left and right curb plates of the rocking arm; and
   wherein in the folding state of the arm, the spring plunger enters into the location recess to keep the arm in the folding state.

9. The unmanned aerial vehicle arm adjustment device according to claim 1, wherein at least one of the left and right curb plates is provided with a weight-reducing hole or groove.

10. The unmanned aerial vehicle arm adjustment device according to claim 1, wherein the rocking arm comprises a connecting piece and an arm barrel which are integrally manufactured, wherein one end of the connecting piece is articulated with the left and right curb plates, wherein the connecting piece is opened with the snap groove, wherein the arm barrel is a hollow tube in a hoop shape, a diameter of the hollow tube being greater than a diameter of the unmanned aerial vehicle arm, wherein a free end of the arm barrel is tight locked through at least one set of bolts and nuts, and wherein a weight-reducing hole or groove is provided on the arm barrel.

11. The unmanned aerial vehicle arm adjustment device according to claim 1, further comprising:
    a stop block provided on at least one of the left and right curb plates for limiting the rotation angle of the rocking arm.

12. An unmanned aerial vehicle, comprising an unmanned aerial vehicle arm adjustment device for adjusting an unmanned aerial vehicle arm into a folding state or an extracting state with respect to a fuselage of the aerial vehicle, wherein the unmanned aerial vehicle arm adjustment device comprises:
    left and right curb plates connected to the fuselage;
    a rocking arm connected to the unmanned aerial vehicle arm, wherein one end of the rocking arm is articulated with the left and right curb plates, and a first engaging part is provided on the rocking arm; and
    a locking member articulated with the left and right curb plates, wherein the locking member is provided with a second engaging part for engaging with the first engaging part;
    wherein the locking member is adapted to rotate in a first direction to force the second engaging part to engage with the first engaging part so as to hold the rocking arm such that the unmanned aerial vehicle arm is in the extracting state;
    wherein the locking member is adapted to rotate in a second direction opposite to the first direction to force the second engaging part to disengage with the first engaging part so as to release the rocking arm such that the unmanned aerial vehicle arm is able to be rotated into the folding state; and
    wherein the first engaging part comprises a snap groove, wherein the locking member comprises a depressing plate, and wherein the second engaging part comprises a columnar member provided on the depressing plate and for engaging with the snap groove.

* * * * *